Patented Aug. 7, 1928.

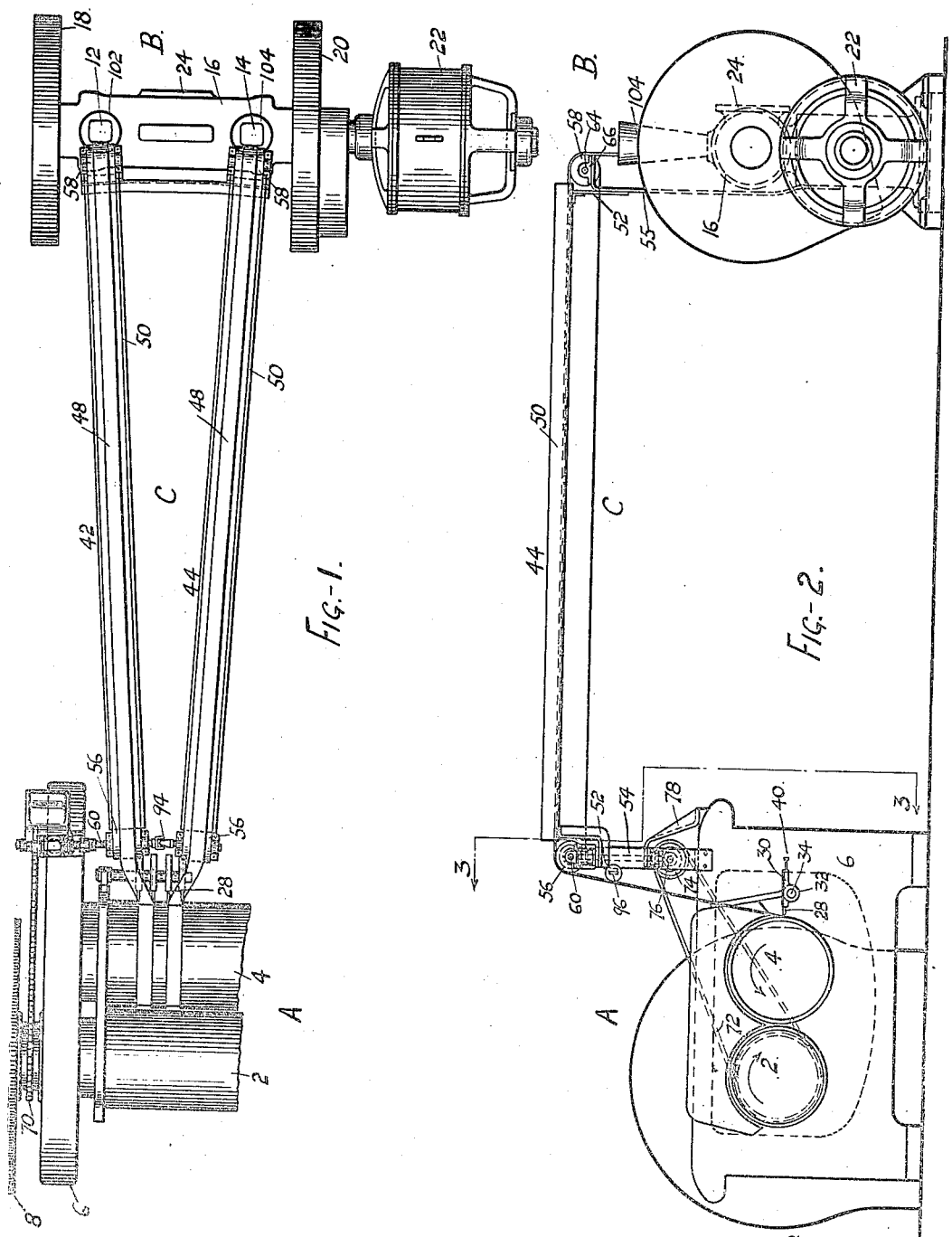

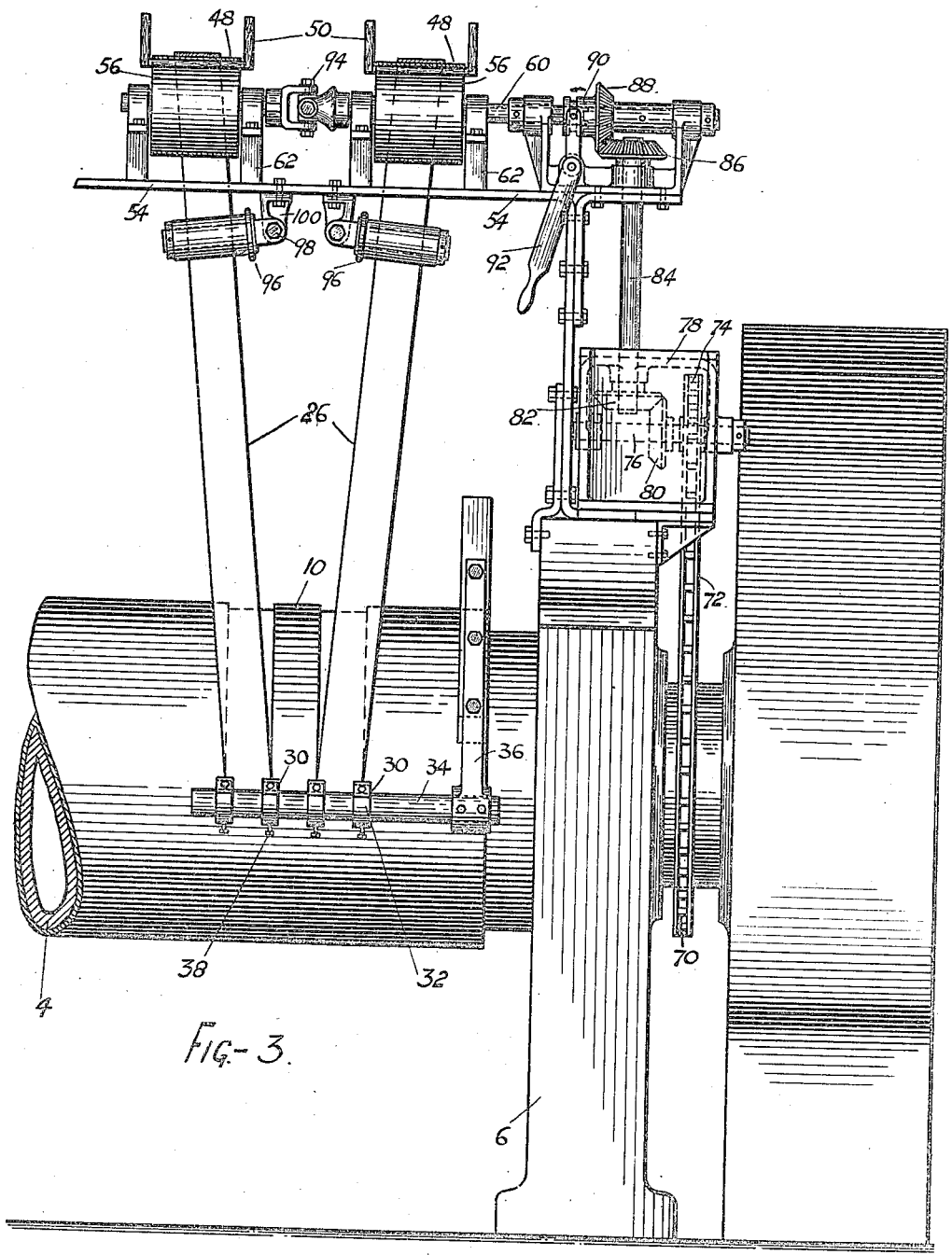

1,680,171

UNITED STATES PATENT OFFICE.

OSCAR D. HOLLENBECK, OF RACINE, WISCONSIN.

APPARATUS FOR USE IN RUBBER FACTORIES.

Application filed September 22, 1923. Serial No. 664,229.

In the operation of rubber factories it is necessary, before feeding the rubber mixes or masses to various machines which shape or prepare the rubber for further use in the manufacture of various articles, to give the rubber, which is stiff and not easily workable cold, preliminary treatment known as "warming up." This operation is performed upon warming mills which usually comprise two heated rolls through which the rubber mass is run for a sufficiently long period to cause it to become heated through and thoroughly and sufficiently plastic for the subsequent operations, such as performed in tubing mills, calenders, or the like.

It is customary, and as far as known to me prior to the perfection of the present invention, for the warming up mill man to cut from the rubber mass or sheet a sufficient amount of rubber for the machine which he is supplying, be it a calender or a tubing machine, and to carry the hot rubber over to the machine. I believe that this is the universal practice, and it is the purpose of the present invention to replace these operations and the disadvantages attendant upon them.

Among the disadvantages of the old system is the fact that the human element is depended upon for the sufficient and satisfactory supply of the warmed up rubber to the subsequent machines, and in machines which use the rubber very rapidly it requires a steady and unfaltering attention on the part of the warming mill operator, or more than one mill operator, to keep the tubing machine, calender, or other machines supplied, with much running back and forth between the machines, and should the warming mill man be slow or inattentive, much damage may result in the processing of the rubber.

Furthermore, the carrying of the hot rubber across the factory floor is an unpleasant and dangerous task, oftentimes resulting in burned hands, and while the mill man is carrying the rubber to the subsequent machine his attention is, of course, distracted from the mill.

It is the purpose of the present invention to devise an apparatus for use in rubber factories in which the warmed up rubber will be automatically removed from the warming up mill and conveyed to and delivered to the subsequent processing machine. By providing an apparatus of this character, the various disadvantages which have been enumerated are eliminated and the work of supplying the machines is cheapened and rendered more efficient, while the mill man can devote his entire attention to his mill and is not required to be running back and forth across the factory floor. A single mill man can, therefore, supply the processing machines more effectively and cheaply than heretofore.

In an apparatus of this character it is desirable that the amount of rubber delivered by the warming mill may be varied to suit the requirements of the subsequent processing machine and it is, therefore, one of the purposes and advantages of the invention that the amount of rubber delivered by the mill may be varied without changing the operation of the mill.

For the purpose of illustrating the present invention, there is shown herein the apparatus constructed and operated in conjunction with a tubing machine, but it is obvious that other machines may be fed by the device with equally beneficial results. It is also to be noted that changes and modifications may be made in the exact forms of the invention without in any way departing from the essential features of the invention.

For a more complete understanding of this invention, together with further objects and advantageous details and combination of parts, reference may be had to the accompanying drawings illustrating an embodiment thereof, in which Figure 1 shows a plan view of the apparatus selected to illustrate the invention;

Figure 2 is a side elevation thereof; and

Figure 3 is a vertical section along the line 3—3 of Figure 2 looking toward the warming-up mill.

In its general aspects the illustrated mechanism includes a mill A on which the rubber stock is warmed into a soft and plastic condition, a tubing machine B from which the treads are extruded, and a conveying mechanism C adapted to receive the stock from the mill and automatically transfer it into the tubing machine.

The general features of the mill A and the tubing machine B herein shown are of standard construction, and only such portions thereof as are intimately related to the novel features of this invention will be described in detail, and for further information as to the details of construction of the machines, reference may be made to any of the standard machines now in use.

The mill A consists of two rolls 2 and 4 which may have the usual steam and water connections for regulating their temperature. These rolls are journalled in a frame 6 and are provided with adjustable bearings by means of which the distance of the rolls apart may be regulated as desired. The shaft of the roll 2 carries a gear 8 driven from any convenient source of power. The rolls are connected by suitable gearing so that they rotate in opposite directions at the same or different speeds. The stock is fed between the rolls and is sheeted upon the roll 4 in a wide sheet 10, the thickness of which is determined by the adjustment of the rolls.

The tubing machine B illustrated is of the double feed type having openings 12 and 14 through which stock is fed into the casing 16. Within the central bore of the casing are oppositely threaded feed screws (not shown), the shafts of which carry gears 18 and 20 which are driven by suitable connections from a motor 22. The feed screws force the stock toward the center of the casing 16, in which portion of the casing is located a passageway communicating with a die head 24.

The stock is severed from the mill A in strips 26 by knives 28. Each knife is secured in a holder 30 having an integral collar 32 which surrounds a transverse rod 34 supported in front of the roll by brackets 36 secured to the machine frame. The knife-holders 30 are individually adjustable longitudinally of the shaft 34 to vary the width of the strips 26, the holders being clamped in position by set screws 38. By the adjustment of the knife-holders along the length of the rod 34, it is possible to cut the stock in proper widths to suit the requirements of the tubing machine.

The knives 28 are individually urged yieldingly against the roll 4 by a spring (not shown) mounted within the holder 30, having one end bearing against the inner end of the knife and the other against a tension adjusting screw 40.

In order to replenish the supply of stock from the removed portion of the sheet, the rolls 2 and 4 may be spaced a greater distance apart at the end where the knives are located than at the other end, the tendency of the stock being at all times to crowd toward the knives. This result may be accomplished by having the operator cut the stock from that portion of the rolls remote from the knives and throw it into the rolls at the point where the knives are situated.

The severed strips 26 are led upwardly from the knives to duplicate conveyors 42 and 44 which deliver them to the openings 12 and 14 respectively of the tubing machine B. Each conveyor comprises an endless belt 48 having the upper run thereof passing through a runway 50 supported at each end by a bracket 52 which in turn is mounted upon brackets 54 and 55 rising above the frame of the mill and tube machine respectively.

Each conveyor belt 48 passes over pulleys 56 and 58 supported at each end of the runway. The pulleys 56 are mounted upon a shaft 60 carried by brackets 62 supported upon the main bracket 54. Pulleys 58 are mounted on shafts 64 journalled in brackets 66 secured to the supporting bracket 55.

Provision is made for driving the conveyor belts from and at the same speed as the warming mill, the varying requirements of any particular tubing machine being taken care of by the adjustment of the knives as described above. To this end, one end of the shaft of roll 2 is provided with a sprocket 70 which is connected by means of a chain 72 to a second sprocket 74 mounted upon a short horizontal shaft 76 supported in a bracket 78 secured to the frame of the mill. The shaft 76 is provided with a beveled gear 80 adapted to mesh with a gear 82 upon the lower end of a vertical shaft 84 having a gear 86 upon the upper end thereof (Figure 3).

The gear 86 is adapted to mesh with a gear 88 loosely mounted upon the outer end of the conveyor pulley shaft 60. Any suitable clutch mechanism is provided between the hub of the gear 88 and the pulley shaft, a convenient form of clutch being shown at 90. The clutch is operated by any convenient means such as a handle 92.

The conveyors 42 and 44 diverge from one another as they approach the tubing machine, and in order to compensate for the angle at which the pulleys 56 are set, the drive shaft 60 is provided with a universal coupling 94 between the pulleys, as clearly shown in Figures 1 and 3.

In order to guide the severed strips 26 in their passage from the mill roll 4 to the conveyor belts, the strips are passed over guide rollers 96 pivoted at 98 to brackets 100 depending from the main supporting bracket 54. The guide rollers may be adjusted in a vertical plane about the pivots 98 to properly centralize the strips upon the conveyors. The feed openings 12 and 14 of the tubing machine are provided with funnels 102 and 104 respectively, the upper ends of which are adjacent the discharge end of the conveyors 42 and 46 and are adapted to guide the strips 26 into the tubing machine.

Since the manner in which the different parts of the apparatus operate to perform their functions and the sequence of the operations as a whole have been set forth in connection with the detailed description, no further description of the operation is necessary for a complete understanding of the invention.

It will be understood that the operation of the apparatus is not necessarily limited to tubing machines or to a single tubing machine, as one or more of these or other machines may be fed from a single mill. Other adaptations of the invention may be employed as desired.

Having described the invention, what I claim as new and desire to secure by Letters Patent of the United States is:

In an apparatus for the uses and purposes set forth, the combination of a warming mill for rubber stock, comprising heated rolls by which the rubber is sheeted and warmed so as to be plastic for subsequent operations, a plurality of conveyor belts, a direct driving connection for one of said conveyor belts driven from one of the rolls of the warming mill to drive the conveyor belts at the same speed as the mill, a flexible driving connection between said belts, and means to remove strips of rubber from the mill, the strips being conducted by said conveyors to points where they are automatically delivered as warmed, plastic rubber to separated locations for subsequent processing.

OSCAR D. HOLLENBECK.